US012692060B2

(12) United States Patent
Nagata

(10) Patent No.: US 12,692,060 B2
(45) Date of Patent: Jul. 28, 2026

(54) METHOD OF MANUFACTURING CONTENTS-FILLED PACKAGING CONTAINER

(71) Applicant: HOSOKAWA YOKO CO., LTD., Tokyo (JP)

(72) Inventor: Kenji Nagata, Tokyo (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 69 days.

(21) Appl. No.: 18/285,624

(22) PCT Filed: Apr. 8, 2022

(86) PCT No.: PCT/JP2022/017364
§ 371 (c)(1),
(2) Date: Oct. 4, 2023

(87) PCT Pub. No.: WO2022/215750
PCT Pub. Date: Oct. 13, 2022

(65) Prior Publication Data
US 2024/0190635 A1 Jun. 13, 2024

(30) Foreign Application Priority Data
Apr. 8, 2021 (JP) ................................ 2021-065679

(51) Int. Cl.
*B31B 70/00* (2017.01)
*B65B 5/06* (2006.01)
(Continued)

(52) U.S. Cl.
CPC .......... *B65D 77/003* (2013.01); *B31B 70/008* (2017.08); *B65B 5/061* (2013.01);
(Continued)

(58) Field of Classification Search
CPC ................ B65D 77/003; B65D 77/033; B65D 77/0406; B31B 70/008; B31B 2150/0016; B31B 2120/50
(Continued)

(56) References Cited

U.S. PATENT DOCUMENTS 4,082,216 A 4/1978 Clarke
4,622,693 A * 11/1986 Mykleby .............. B65D 77/003 383/119
(Continued)

FOREIGN PATENT DOCUMENTS

CN 101279655 A 10/2008
CN 111819136 A 10/2020
(Continued)

OTHER PUBLICATIONS

International Search Report for Application No. PCT/JP2022/017364 mailed Jun. 28, 2022 (4 pages).
(Continued)

*Primary Examiner* — Nathan J Newhouse
*Assistant Examiner* — Nina K Attel
(74) *Attorney, Agent, or Firm* — NIXON PEABODY LLP; Jeffrey L. Costellia

(57) ABSTRACT

A packaging container-filler member includes: a front-side sheet and a back-side sheet disposed to oppose each other; a first connecting sheet connecting outer edges of the front-side and back-side sheets on a first side in a first direction along the front-side sheet; a second connecting sheet connecting outer edges of the front-side and back-side sheets on a second side in the first direction; and a third connecting sheet connecting outer edges of the front-side and back-side sheets on a first side in a second direction along the front-side sheet, the second direction crossing the first direction. The front-side and back-side sheets, and the
(Continued)

first and second connecting sheets constitute a cylindrical body whose cross section is rectangular when the cylindrical body has a three-dimensional shape. The first, second and third connecting sheets are each folded in an opposing direction in which the front-side and back-side sheets oppose each other.

5 Claims, 8 Drawing Sheets

(51) Int. Cl.

| | |
|---|---|
| ***B65B 7/02*** | (2006.01) |
| ***B65B 43/14*** | (2006.01) |
| ***B65B 43/26*** | (2006.01) |
| ***B65D 77/00*** | (2006.01) |
| ***B65D 77/04*** | (2006.01) |
| *B31B 120/40* | (2017.01) |

(52) U.S. Cl.
CPC ................ *B65B 7/02* (2013.01); *B65B 43/14* (2013.01); *B65B 43/26* (2013.01); *B65D 77/0406* (2013.01); *B31B 2120/40* (2017.08)

(58) Field of Classification Search
USPC .......................... 383/104, 119; 493/186–268
See application file for complete search history.

(56) References Cited

U.S. PATENT DOCUMENTS

| | | | | |
|---|---|---|---|---|
| 5,094,547 | A * | 3/1992 | Graham | B65D 33/02 229/920 |
| 5,147,062 | A | 9/1992 | Heuberger et al. | |
| 9,771,176 | B2 * | 9/2017 | Kastanek | B65D 5/3628 |
| 2001/0029226 | A1 | 10/2001 | Ichikawa et al. | |
| 2005/0053315 | A1 | 3/2005 | Aasen | |
| 2020/0407119 | A1 | 12/2020 | Ichikawa et al. | |

FOREIGN PATENT DOCUMENTS

| | | | |
|---|---|---|---|
| EP | 0398225 | A1 | 11/1990 |
| JP | 61-178339 | | 11/1986 |
| JP | H-11-171174 | | 6/1999 |
| JP | 2001-322187 | A | 11/2001 |
| JP | 2006-240671 | A | 9/2006 |
| JP | 2007-045494 | A | 2/2007 |
| JP | 2007-069944 | A | 3/2007 |
| JP | 2007-119076 | | 5/2007 |
| JP | 2007-533553 | A | 11/2007 |
| JP | 2008-529909 | A | 8/2008 |
| JP | 2008-290731 | | 12/2008 |
| JP | 2010-137908 | | 6/2010 |
| SG | 135919 | A1 | 10/2007 |
| WO | WO-2019/172177 | | 9/2019 |

OTHER PUBLICATIONS

Office Action in Chinese Patent Application No. 202280033343.0, with English Translation of Search Report mailed May 30, 2, (9 pages).

Extended European Search Report in European Application No. 22784732.4, mailed May 13, 2025, (9 pages).

Japanese Office Action (Application No. 2021-065679) dated Jul. 29, 2025 with English Translation (8 pages total).

Japanese Notice of Allowance in Japanese Application No. 2021-065679 mailed Feb. 3, 2026 with English Translation (6 pages total).

* cited by examiner

METHOD OF MANUFACTURING CONTENTS-FILLED PACKAGING CONTAINER

TECHNICAL FIELD

The present invention relates to a packaging container-filler member, a packaging container, a contents-filled packaging container, and a method of manufacturing a contents-filled packaging container.

Priority is claimed on Japanese Patent Application No. 2021-065679, filed Apr. 8, 2021, the content of which is incorporated herein by reference.

BACKGROUND ART

In the related art (for example, refer to Patent Document 1), a packaging container is known in which a cylindrical sleeve is inserted into a bag-shaped member (i.e., a bag body).

When filling the packaging container with contents, the packaging container is suctioned by suction pads and is expanded into a substantial box shape to become a box-shaped packaging body. Two holding plates with a narrow space between the tips thereof are inserted into the box-shaped packaging body. The space between the two holding plates is widened such that the two holding plates are approximately parallel. By heat-welding, side flaps of the box-shaped packaging body are adhered to side surfaces thereof, and protruding portions of a top flap are adhered to the side surfaces. The box-shaped packaging body is ejected from the holding plates. The contents are filled from the bottom of the box-shaped packaging body having an opening thereinto, and the opening is heat-sealed. A bottom flap formed by the heat-sealing is bent and welded to the bottom, and thus the box-shaped packaging body (i.e., a contents-filled packaging container) is completed.

In the packaging container disclosed in Patent Document 1, the sleeve inserted into the bag-shaped member is likely to be crushed by forces applied thereto from the outside of the packaging container during heat-welding or the like. Therefore, as shown in FIG. 10, at the time a flap 161 of a box-shaped packaging body 160 in which a packaging container 150 is made to be a substantial box shape is welded to the bottom of the box-shaped packaging body 160 using a bonding machine 169, a sleeve 151 is supported by holding plates 170 from the inside of the sleeve 151. Then, the flap 161 is welded to the bottom of the box-shaped packaging body 160 using a heater block 106.

DOCUMENT OF RELATED ART

Patent Document

[Patent Document 1] Japanese Unexamined Patent Application, First Publication No. 2008-290731

SUMMARY OF INVENTION

Problems to Solved by Invention

However, when a step of inserting the holding plates 170 to support the welding of the flap 161 is performed, thereafter, a step of separating the holding plates 170 from the box-shaped packaging body 160 is also required, which increases the period of time required for filling, and that is, it may be difficult to increase the manufacturing quantity of the contents-filled packaging containers per unit time. Moreover, after the holding plates 170 are removed from the box-shaped packaging body 160, contents 175 are filled into the box-shaped packaging body 160.

The present invention is made in view of the above problems, and an object thereof is to provide a packaging container-filler member that can efficiently withstand external forces even if no holding plate is used to allow a protruding portion (i.e., a flap) of a bag-shaped member to be welded to a bag body, and that can decrease the period of time required for filling, a packaging container including the packaging container-filler member, a contents-filled packaging container, and a method of manufacturing a contents-filled packaging container.

Means for Solving Problems

In order to solve the above problems, the present invention proposes the following means.

A packaging container-filler member of a first aspect of the present invention includes: a front-side sheet and a back-side sheet disposed to oppose each other; a first connecting sheet connecting outer edges of the front-side sheet and the back-side sheet on a first side in a first direction along the front-side sheet; a second connecting sheet connecting outer edges of the front-side sheet and the back-side sheet on a second side in the first direction; and a third connecting sheet connecting outer edges of the front-side sheet and the back-side sheet on a first side in a second direction along the front-side sheet, the second direction crossing the first direction, wherein the front-side sheet, the back-side sheet, the first connecting sheet, and the second connecting sheet constitute a cylindrical body whose cross section is rectangular when the cylindrical body has a three-dimensional shape, and the first connecting sheet, the second connecting sheet, and the third connecting sheet are each folded in an opposing direction in which the front-side sheet and the back-side sheet oppose each other.

According to the first aspect, the packaging container-filler member is accommodated in a bag body through, for example, an opening of the bag body. Then, the first connecting sheet, the second connecting sheet, and the third connecting sheet, which have been each folded in the opposing direction, are each deformed so as to extend in the opposing direction. Then, a space is secured between the front-side sheet and the back-side sheet. The front-side sheet, the back-side sheet, the first and second connecting sheets as a whole are formed into a cylindrical shape, and the outer edges of the front-side sheet 11 and the back-side sheet 12 on the first side in the second direction are connected by the third connecting sheet extending in the opposing direction. Therefore, the third connecting sheet supports, in the opposing direction, forces acting from the outside of the bag body. It becomes easier to fill contents inside the packaging container-filler member.

Therefore, since it efficiently withstands external forces in the opposing direction, no holding plates are required as in the related art, and the period of time required for filling can be decreased.

In the packaging container-filler member of the first aspect, the first connecting sheet may be folded to be convex from the second side toward the first side in the first direction, the second connecting sheet may be folded to be convex from the first side toward the second side in the first direction, and the third connecting sheet may be folded to be convex from a second side toward the first side in the second direction of the front-side sheet and the back-side sheet.

In this case, the folded first connecting sheet, the folded second connecting sheet, and the folded third connecting sheet do not overlap the front-side sheet and the back-side sheet in the opposing direction. Therefore, the thickness of the packaging container-filler member in the opposing direction can be reduced.

In the packaging container-filler member of the first aspect, the third connecting sheet may include: a first connecting piece connected to the outer edge of the front-side sheet on the first side in the second direction through a first hinge, and a second connecting piece connected to an outer edge of the first connecting piece through a second hinge and connected to the outer edge of the back-side sheet on the first side in the second direction through a third hinge.

In this case, when the folded third connecting sheet is extended in the opposing direction, the first connecting piece and the second connecting piece rotate on the first hinge, the second hinge, and the third hinge, and the first connecting piece and the second connecting piece are arranged in the opposing direction. Therefore, the first connecting piece and the second connecting piece arranged in the opposing direction support, in the opposing direction, forces acting in the opposing direction from the outside of the bag body. Therefore, it is possible to more effectively withstand external forces in the opposing direction.

A packaging container of a second aspect of the present invention includes: the packaging container-filler member of the first aspect; and a bag body provided with an opening facing a predetermined side and accommodating the packaging container-filler member, wherein the packaging container-filler member is disposed such that a second side thereof in the second direction is the same as the predetermined side.

According to the second aspect, contents can be filled in a space between the front-side sheet and the back-side sheet through the opening of the bag body from, for example, the predetermined side of the packaging container.

A contents-filled packaging container of a third aspect of the present invention includes: the packaging container of the second aspect; and contents disposed inside the packaging container-filler member, the packaging container-filler member having the first connecting sheet, the second connecting sheet, and the third connecting sheet each disposed to extend in the opposing direction and being accommodated in the packaging container, wherein the opening of the bag body is closed.

According to the third aspect, the first connecting sheet, the second connecting sheet, and the third connecting sheet are each disposed to extend in the opposing direction, and thus it is possible to efficiently withstand external forces and to decrease the period of time required for filling. The contents can be disposed inside the packaging container-filler member in which a space is secured between the front-side sheet and the back-side sheet. By closing the opening of the bag body, the contents can be stored in the bag body.

A method of manufacturing a contents-filled packaging container of a fourth aspect of the present invention, in which the packaging container of the second aspect is filled with contents, including: opening peripheral edge portions facing each other of the opening of the bag body; deforming the first connecting sheet, the second connecting sheet, and the third connecting sheet so as to extend in the opposing direction inside the bag body; filling the contents between the front-side sheet and the back-side sheet of the packaging container-filler member through the opening of the bag body; and closing the opening of the bag body.

According to the present invention, the first connecting sheet, the second connecting sheet, and the third connecting sheet are each deformed to extend in the opposing direction, and thus it is possible to efficiently withstand external forces, so no holding plates as in the related art are required, and the period of time required for filling can be decreased. The contents can be disposed inside the packaging container-filler member in which a space is secured between the front-side sheet and the back-side sheet. By closing the opening of the bag body, the method of manufacturing a contents-filled packaging container that allows the contents to be stored in the bag body can be obtained.

Effects of Invention

According to a packaging container-filler member, a packaging container, a contents-filled packaging container, and a method of manufacturing a contents-filled packaging container of the present invention, no holding plate as in the related art is required because the packaging container-filler member can efficiently withstand external forces, and the period of time required for filling can be decreased.

EMBODIMENTS OF INVENTION

An embodiment of a packaging container-filler member, a packaging container, a contents-filled packaging container, and a method of manufacturing a contents-filled packaging container of the present invention is described below with reference to FIGS. 1 to 9.

Figure 1:
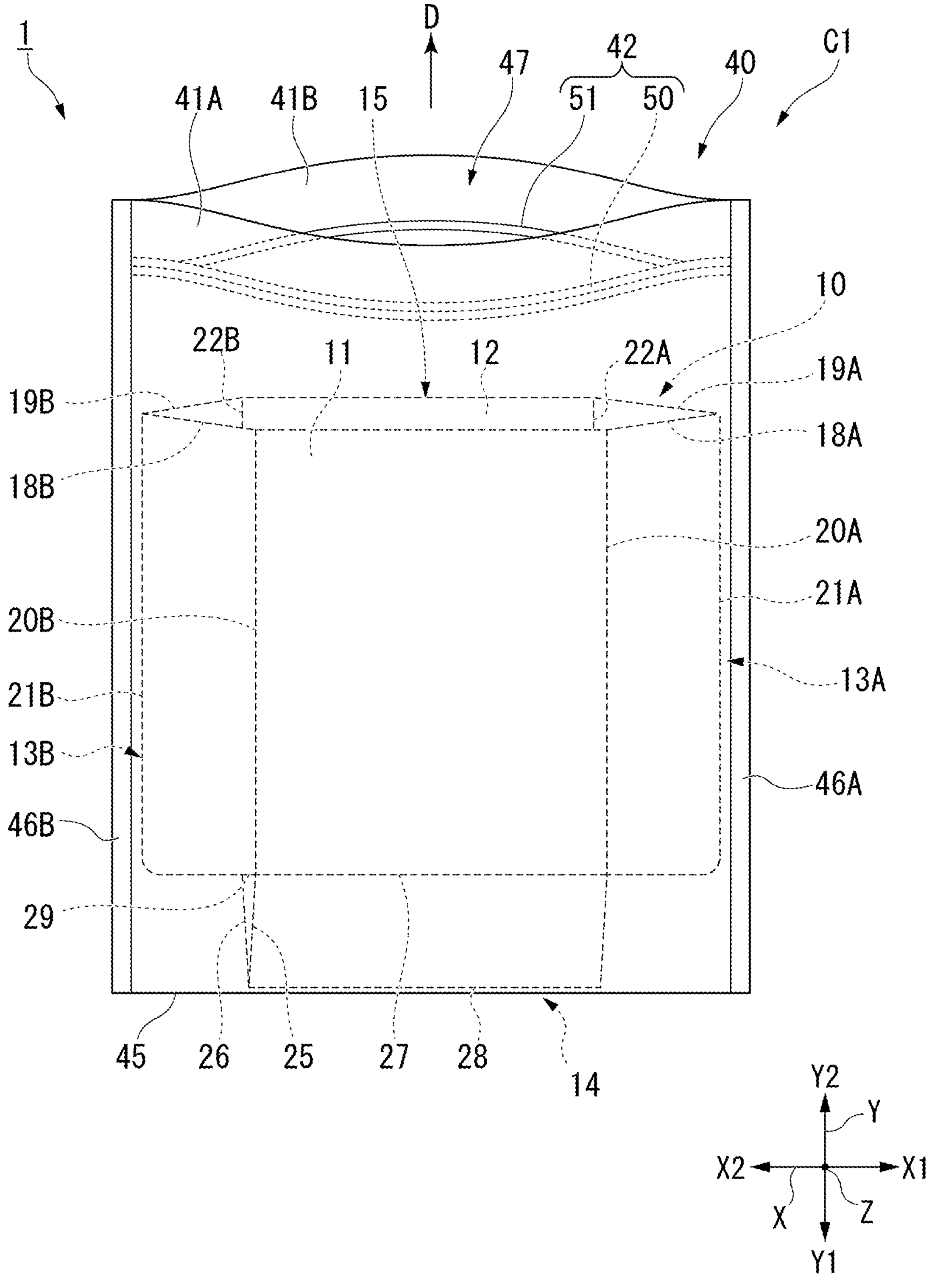
FIG. 1 is a front view of a packaging container of an embodiment of the present invention when the packaging container is in a flat bag state.

A packaging container 1 shown in FIG. 1 is in a flat bag state C1 where it is flat. The packaging container 1 includes a packaging container-filler member 10 of the present embodiment and a bag body 40. Hereinafter, the states of the packaging container-filler member 10 and the bag body 40 shown in FIG. 1 are also referred to as the flat bag state C1.

First, the materials forming the packaging container-filler member 10 are described.

The packaging container-filler member 10 is formed of, for example, synthetic paper that has coating layers on two sides of a sheet of base paper.

For the base paper, various paperboards such as unbleached kraft paper, bleached kraft paper, and white paperboard can be used. The coating layer is formed of a thermoplastic resin such as polyethylene resin having heat-sealability. By covering the base paper with the coating layer, in a method of manufacturing a contents-filled packaging container described below, the packaging container-filler member 10 can be manufactured from a packaging container-filler member 10 having a developed shape by heat-sealing, and the packaging container-filler member 10 can be welded to the bag body 40 by heat-sealing. Therefore, the manufacture of the contents-filled packaging container is simplified.

It is sufficient that the synthetic paper has a thickness or more capable of stacking contents-filled packaging containers when packaging containers 1 in the flat bag state C1 are made to be the contents-filled packaging containers. It is sufficient that the basis weight of the synthetic paper is 209 $g/m^2$ (grams per square meter) or more. This is because it becomes possible to stack the contents-filled packaging containers in about six layers. The basis weight of the synthetic paper is preferably 310 $g/m^2$ or more, more preferably 450 $g/m^2$ or more.

If the basis weight of the synthetic paper exceeds 600 $g/m^2$, the repulsion caused by the thickness of the synthetic paper makes it difficult to maintain the three-dimensional shape of the contents-filled packaging container, and the amount of materials used for the synthetic paper is unnecessarily increased. This may be undesirable in view of the recent trend toward resource reduction.

When the packaging container-filler member 10 is formed of paper such as synthetic paper, the packaging container-filler member 10 can have an excellent dead-hold property and can easily maintain its shape.

The packaging container-filler member may be formed of a plastic sheet. In this case, the packaging container-filler member is formed of, for example, a polyethylene sheet with a thickness of 100 μm (micrometers). In this case, since the bag body 40 is formed of a film material mainly made of plastic as described below, the packaging container does not have to be separated into paper and plastic when disposing of it.

When the packaging container-filler member is formed of a plastic sheet, it is sufficient that the thickness of the sheet is 50 μm or more. This is because it becomes possible to stack the contents-filled packaging containers in about six layers. The thickness of the sheet is preferably 100 μm or more, more preferably 250 μm or more.

If the thickness of the sheet exceeds 1.5 mm, the repulsion caused by the thickness of the sheet makes it difficult to maintain the three-dimensional shape of the contents-filled packaging container, and the amount of materials used for the sheet is unnecessarily increased. This may be undesirable in view of the recent trend toward resource reduction.

Next, the specific configuration of the packaging container-filler member 10 is described. The packaging container-filler member 10 of the present embodiment is used to apply a desired shape to the bag body 40.

As shown in FIG. 1, the packaging container-filler member 10 includes a front-side sheet 11, a back-side sheet 12, a first connecting sheet 13A, a second connecting sheet 13B, and a third connecting sheet 14.

The front-side sheet 11 and the back-side sheet 12 have an equal rectangular shape when viewed in the thickness directions thereof. The front-side sheet 11 and the back-side sheet 12 are disposed to oppose each other. The phrase "oppose each other" as used herein does not include only the meaning of facing each other but also include the meaning of coming into contact with each other.

Hereinafter, when the front-side sheet 11 is viewed in the thickness direction, a direction along a first outer edge of the front-side sheet 11 is referred to as a first direction X. When the front-side sheet 11 is viewed in the thickness direction, a direction along a second outer edge orthogonal to the first outer edge of the front-side sheet 11 is referred to as a second direction Y. The first direction X and the second direction Y are directions along the front-side sheet 11. The second direction Y is a direction orthogonal to (crossing) the first direction X. A direction in which the front-side sheet 11 and the back-side sheet 12 oppose each other is referred to as an opposing direction Z.

The first direction X corresponds to the left-right direction of the packaging container-filler member 10 and the packaging container 1 shown in FIG. 1, and the second direction Y corresponds to the up-down direction of the packaging container-filler member 10 and the packaging container 1 shown in FIG. 1. In the present embodiment, an opening 47 described below is provided at the upper portion of the packaging container 1, but the present invention is not limited thereto, and a configuration may be adopted in which the opening is provided at the side or the bottom of the packaging container.

In the present embodiment, the configurations of the first connecting sheet 13A and the second connecting sheet 13B are equal to each other. Therefore, the components of the first connecting sheet 13A are represented by adding a capital letter "A" to the numerals of reference signs. The components of the second connecting sheet 13B corresponding to those of the first connecting sheet 13A are represented by adding a capital letter "B" to the same numerals as those of the reference signs of the first connecting sheet 13A. Thereby, duplicate descriptions are omitted.

For example, a first side edge-connecting piece 18A of the first connecting sheet 13A and a first side edge-connecting piece 18B of the second connecting sheet 13B, which are described below, have an equal configuration.

The first connecting sheet 13A connects the outer edges of the front-side sheet 11 and the back-side sheet 12 on a first side X1 (hereinafter simply referred to as the "first side X1", i.e., the right side in FIG. 1) in the first direction X. The first connecting sheet 13A includes the first side edge-connecting piece 18A, a second side edge-connecting piece 19A, a first side edge hinge 20A, a second side edge hinge 21A, and a third side edge hinge 22A.

The side edge-connecting pieces 18A and 19A have an equal rectangular shape when viewed in the thickness directions thereof. The side edge hinges 20A, 21A and 22A are formed by making the synthetic paper easy to bend by, for example, compressing the synthetic paper in the thickness direction thereof, forming perforations (continuous small holes) in the synthetic paper or the like. That is, the side edge hinges 20A, 21A and 22A of the present embodiment correspond to bending lines of the synthetic paper that are bendable.

The first side edge hinge 20A is provided at the outer edge of the front-side sheet 11 on the first side X1 to extend in the second direction Y. The first side edge hinge 20A is formed on the entire length of the front-side sheet 11 in the second direction Y.

The first side edge-connecting piece 18A is connected to the outer edge of the front-side sheet 11 on the first side X1 through the first side edge hinge 20A. The first side edge-connecting piece 18A can rotate on the first side edge hinge 20A relative to the front-side sheet 11.

The second side edge hinge 21A is provided at the outer edge of the first side edge-connecting piece 18A on the first side X1 to extend in the second direction Y. The second side edge hinge 21A is formed on the entire length of the first side edge-connecting piece 18A in the second direction Y.

The third side edge hinge 22A is provided at the outer edge of the back-side sheet 12 on the first side X1 to extend in the second direction Y. The third side edge hinge 22A is formed on the entire length of the back-side sheet 12 in the second direction Y.

The second side edge-connecting piece 19A is connected to the outer edge of the first side edge-connecting piece 18A on the first side X1 through the second side edge hinge 21A. The second side edge-connecting piece 19A is connected to the outer edge of the back-side sheet 12 on the first side X1 through the third side edge hinge 22A. The second side edge-connecting piece 19A can rotate on the second side edge hinge 21A relative to the first side edge-connecting piece 18A and can rotate on the third side edge hinge 22A relative to the back-side sheet 12.

As described above, the first connecting sheet 13A is folded to be convex from a second side X2 described below toward the first side X1 and such that the length of the first connecting sheet 13A in the opposing direction Z decreases. The recitation "the first connecting sheet 13A is folded in the opposing direction Z in which the front-side sheet 11 and the back-side sheet 12 oppose each other" means that the first connecting sheet 13A is folded such that the front-side sheet 11 and the back-side sheet 12 approach each other.

The second connecting sheet 13B connects the outer edges of the front-side sheet 11 and the back-side sheet 12 on the second side X2 (hereinafter simply referred to as the "second side X2", i.e., the left side in FIG. 1) that is opposite to the first side X1 in the first direction X.

The second connecting sheet 13B includes the first side edge-connecting piece 18B, a second side edge-connecting piece 19B, a first side edge hinge 20B, a second side edge hinge 21B, and a third side edge hinge 22B that have the same configurations as the first side edge-connecting piece 18A, the second side edge-connecting piece 19A, the first side edge hinge 20A, the second side edge hinge 21A, and the third side edge hinge 22A of the first connecting sheet 13A, respectively. The second connecting sheet 13B may have a similar configuration to the first connecting sheet 13A.

The second connecting sheet 13B is folded to be convex from the first side X1 toward the second side X2 and such that the length of the first connecting sheet 13B in the opposing direction Z decreases.

The third connecting sheet 14 connects the outer edges of the front-side sheet 11 and the back-side sheet 12 on a first side Y1 (hereinafter simply referred to as the "first side Y1", i.e., the lower side in FIG. 1) in the second direction Y. The third connecting sheet 14 includes a first bottom edge-connecting piece (first connecting piece) 25, a second bottom edge-connecting piece (second connecting piece) 26, a first bottom edge hinge (first hinge) 27, a second bottom edge hinge (second hinge) 28, and a third bottom edge hinge (third hinge) 29.

The bottom edge hinges 27, 28 and 29 are formed by making the synthetic paper easy to bend by compressing the synthetic paper in the thickness direction thereof, forming perforations (continuous small holes) in the synthetic paper or the like. That is, the bottom edge hinges 27, 28 and 29 of the present embodiment correspond to bending lines of the synthetic paper that are bendable.

The bottom edge-connecting pieces 25 and 26 have an equal rectangular shape when viewed in the thickness directions thereof.

The first bottom edge hinge 27 is provided at the outer edge of the front-side sheet 11 on the first side Y1 to extend in the first direction X. The first bottom edge hinge 27 is formed on the entire length of the front-side sheet 11 in the first direction X.

The first bottom edge-connecting piece 25 is connected to the outer edge of the front-side sheet 11 on the first side Y1 through the first bottom edge hinge 27. The first bottom edge-connecting piece 25 can rotate on the first bottom edge hinge 27 relative to the front-side sheet 11.

The second bottom edge hinge 28 is provided at the outer edge of the first bottom edge-connecting piece 25 on the first side Y1 to extend in the first direction X. The second bottom edge hinge 28 is formed on the entire length of the first bottom edge-connecting piece 25 in the first direction X.

The third bottom edge hinge 29 is provided at the outer edge of the back-side sheet 12 on the first side Y1 to extend in the first direction X. The third bottom edge hinge 29 is formed on the entire length of the back-side sheet 12 in the first direction X.

The second bottom edge-connecting piece 26 is connected to the outer edge of the first bottom edge-connecting piece 25 on the first side Y1 through the second bottom edge hinge 28. The second bottom edge-connecting piece 26 is connected to the outer edge of the back-side sheet 12 on the first side Y1 through the third bottom edge hinge 29. The second bottom edge-connecting piece 26 can rotate on the second bottom edge hinge 28 relative to the first bottom edge-connecting piece 25 and can rotate on the third bottom edge hinge 29 relative to the back-side sheet 12.

The third connecting sheet 14 is folded to be convex from a second side Y2 described below toward the first side Y1 and such that the length of the third connecting sheet 14 in the opposing direction Z decreases.

As described above, in the packaging container-filler member 10 that is in the flat bag state C1, each of the connecting sheets 13A, 13B and 14 is folded in half. The connecting sheets 13A, 13B and 14 are so-called outer gussets. The third connecting sheet 14 is separated from each of the connecting sheets 13A and 13B.

The manner in which the connecting sheet is folded is not limited to folding in half but may also be folding in four, folding in six or the like.

Figure 2:
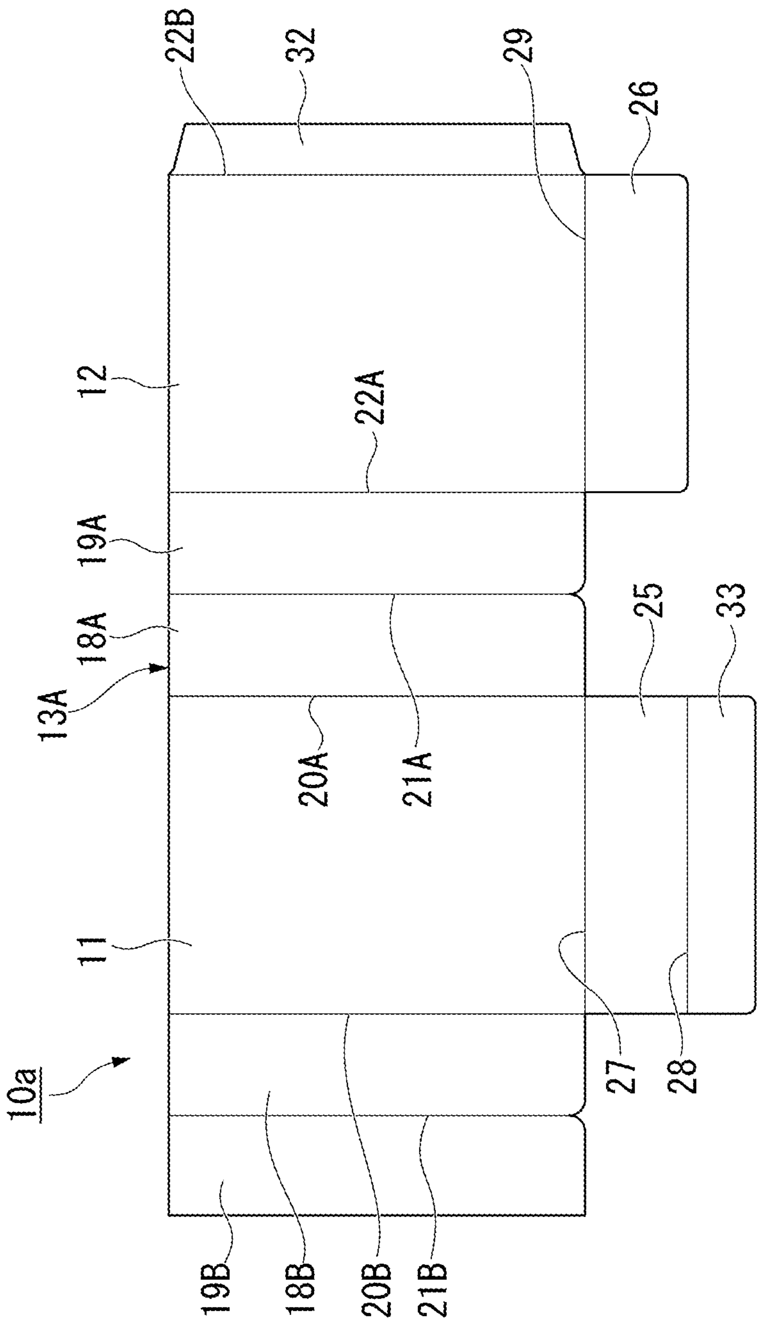
FIG. 2 is a developed view of a packaging container-filler member of the packaging container.

A filler member-developed body 10*a* obtained by developing the packaging container-filler member 10 having the above configuration is configured as shown in, for example, FIG. 2. A bonding margin 32 is connected to an outer edge of the back-side sheet 12 through the third side edge hinge 22B. A bonding margin 33 is connected to an outer edge of the first bottom edge-connecting piece 25 through the second bottom edge hinge 28.

The length and width of each of the bonding margins 32 and 33 are set as appropriate.

The filler member-developed body 10*a* is bent by the side edge hinges 21A, 21B, and the second bottom edge hinge 28 such that the surface of the filler member-developed body 10*a* shown in FIG. 2 becomes the inside thereof. For example, by heat-sealing the bonding margin 32 to the second side edge-connecting piece 19B and heat-sealing the bonding margin 33 to the second bottom edge-connecting piece 26, the packaging container-filler member 10 that is in the flat bag state C1 shown in FIG. 1 is manufactured.

The positions of the bonding margins 32 and 33 may be changed as appropriate, for example, the bonding margin 32 may be connected to the side edge hinge 21A or 21B, and the bonding margin 33 may be connected to the bottom edge hinge 27 or 29.

The filler member-developed body may be made only of base paper. In this case, the bonding margin may be adhered with glue or the like.

Although the shape of the filler member-developed body obtained by developing the packaging container-filler member 10 is not limited to the shape shown in FIG. 2, the shape of FIG. 2 can form a bonding margin in the third connecting sheet and can make it thicker, so during filling, it is possible to more efficiently withstand external forces without requiring holding plates as in the related art. It can be efficiently cut out from a large size sheet in terms of area, and waste loss can be reduced, so it is preferable.

As shown in FIG. 1, the bag body 40 is a bag corresponding to a so-called three-side sealed bag that includes the opening 47, two seal portions, and a connecting portion 45 formed by folding back a film material. The bag body 40 includes two flat surface portions 41A, 41B, and a zipper 42.

The flat surface portions 41A and 41B oppose each other. The flat surface portions 41A and 41B are formed by folding a sheet of film material in half by the connecting portion 45.

In the present embodiment, the film material is a laminate film constituted of a plurality of layers. For example, the film material has a layered structure of heat-seal type (i.e., a surface has a heat-seal coat) OPP (biaxially oriented polypropylene) 25 μm/PE (polyethylene) film 50 μm in this order from the outer surface side of the bag body 40. The innermost layer (PE) is a layer that functions as a sealant. It is preferable that the PE be low density polyethylene (LLDPE). The innermost layer of the film material for the bag body 40 may be formed of a PP (polypropylene) film.

In order to improve the barrier properties of the film material, a layer of aluminum foil may be provided in the film material. In this case, for example, the film material has a layered structure of, for example, heat-seal type OPP 25 μm/aluminum foil 7 μm/PE film 50 μm in this order from the outer surface side of the bag body 40.

As in the above-described film material, it is preferable that in addition to the innermost layer of the film material for the bag body 40, the outer surface-side layer thereof also have heat-sealability.

For the film material, various materials such as plastic films and metal foils can be used depending on the characteristics required for contents to be filled in the packaging container 1, such as moisture proofing and light blocking properties. The film material is manufactured by laminating a plurality of material films or the like to be used for the film material by a dry lamination method, an extrusion lamination method or the like.

The film material may be formed of a single layer. This is in response to the recent trend toward recycling and reusing. In this case, it is preferable that the packaging container-filler member be formed of the same material as the film material.

The bag body 40 includes the connecting portion 45 at a portion where the film material is folded back, and the connecting portion 45 connects the flat surface portions 41A and 41B. At two side edges of the bag body 40, heat-seal portions 46A and 46B are formed by bonding side edges of the flat surface portions 41A and 41B together along the side edges. The heat-seal portions 46A and 46B become side flaps described below.

The end portion of the bag body 40 opposite to the connecting portion 45 is open. The end portion is provided with the opening 47 facing a predetermined side D (i.e., outside).

The zipper 42 is provided on the inner surfaces of the flat surface portions 41A and 41B on the opening 47 side. The zipper 42 allows the opening 47 to freely open and close. The zipper 42 includes a linear female member 50 and a linear male member 51 that are engageable with each other. The female member 50 is provided on the inner surface of the flat surface portion 41A on the opening 47 side. The male member 51 is provided on the inner surface of the flat surface portion 41B on the opening 47 side. The female member 50 and the male member 51 each extend on the entire length between the heat-seal portions 46A and 46B.

When the bag body 40 includes the zipper 42, it is convenient if the packaging container 1 is filled with contents that are not used all at once, such as a plurality of tea bags. By closing the zipper 42, the remaining unused contents can be stored in the packaging container 1.

In order to easily open the bag body 40 with the opening 47 closed, a notch or the like that triggers cutting the flat surface portions 41A and 41B may be provided in a portion of the bag body 40 close to the opening 47.

The packaging container-filler member 10 is accommodated in the bag body 40. The packaging container-filler member 10 is disposed such that the second side Y2 (hereinafter simply referred to as the "second side Y2", i.e., the upper side in FIG. 1) of the packaging container-filler member 10 that is opposite to the first side Y1 in the second direction Y is the same side as the above predetermined side D. The folded first connecting sheet 13A is brought into contact with the heat-seal portion 46A from the second side X2 toward the first side X1 with respect to the heat-seal portion 46A. The folded second connecting sheet 13B is brought into contact with the heat-seal portion 46B from the first side X1 toward the second side X2 with respect to the heat-seal portion 46B. The folded third connecting sheet 14 is brought into contact with the connecting portion 45 from the second side Y2 toward the first side Y1 with respect to the connecting portion 45.

The packaging container-filler member 10 may be welded (or attached) to the flat surface portions 41A and 41B of the bag body 40. In this case, the area in which the packaging container-filler member 10 is welded to the flat surface portions 41A and 41B is not limited. For example, the end portions of the front-side sheet 11 and the back-side sheet 12 on the first side Y1 and the second side Y2 may be welded to the flat surface portions 41A and 41B. These welded portions are formed on substantially the entire lengths of the front-side sheet 11 and the back-side sheet 12 in the first direction X. In this way, the packaging container-filler member 10 and the bag body 40 are fixed together at the end portions on substantially the entire length thereof, and other portions of the packaging container-filler member 10 and the bag body 40 overlap each other are not fixed and are floating so to speak, so when the bag is deformed into three-dimensional, tension is applied to the floating portion of the bag body, thereby smoothing out wrinkles or the like and improving the aesthetic appearance thereof.

By welding the packaging container-filler member 10 to the bag body 40, the reproducibility of the shape of the packaging container 1 can be improved.

The entire thickness of the packaging container 1 that is in the flat bag state C1 is preferably about 25 μm to about 120 μm. If the thickness is less than this value, it becomes difficult to protect the contents. If the thickness exceeds this value, the amount of material used may be unnecessarily increased, which may be undesirable in view of the recent trend toward resource reduction.

Figure 3:
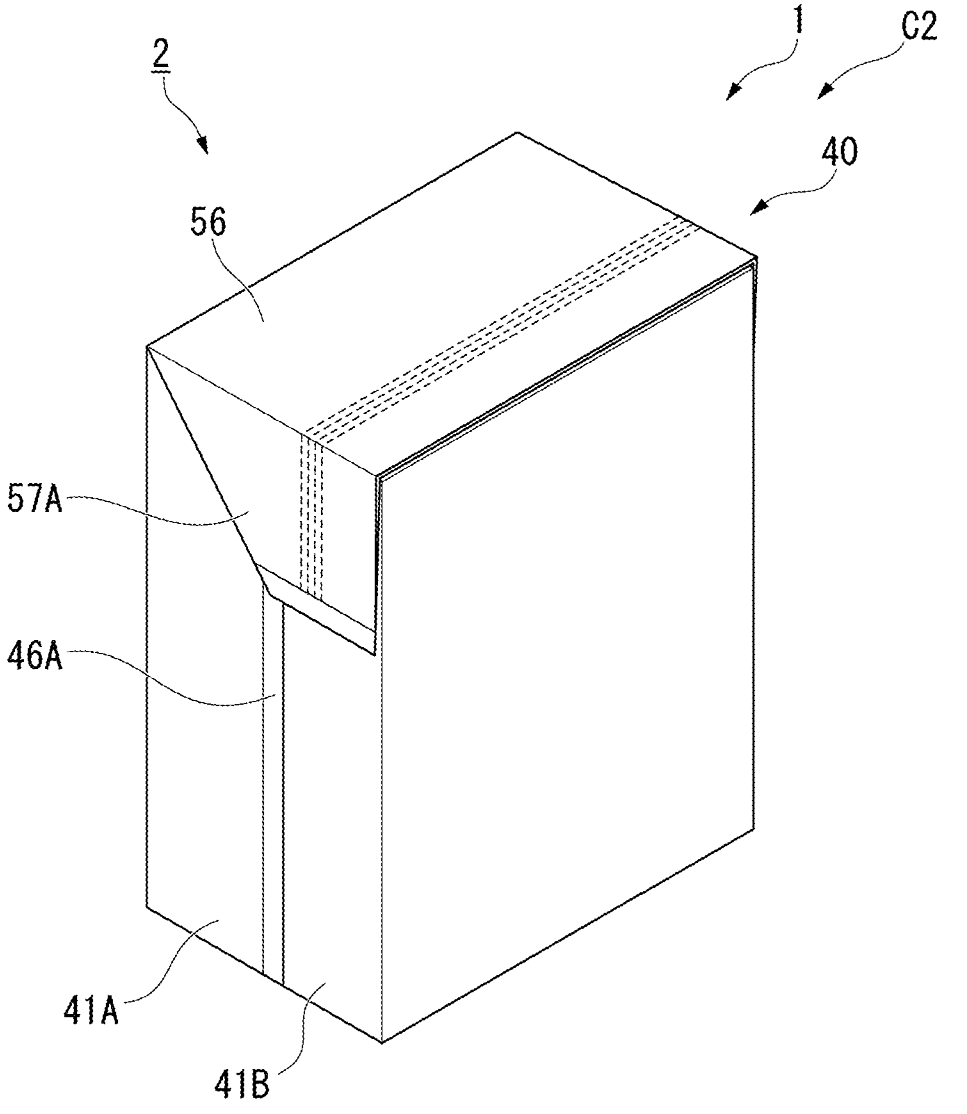
FIG. 3 is a perspective view of a contents-filled packaging container of the embodiment of the present invention.

The packaging container 1 having the above configuration is used by filling contents such as food into the packaging container 1. FIG. 3 shows a contents-filled packaging container 2 in which the packaging container 1 is filled with contents (not shown). When used as the contents-filled packaging container 2, the packaging container 1 is used in being transformed from the flat bag state C1 to a box state C2 having a box shape.

The contents-filled packaging container 2 includes the packaging container 1 that is in the box state C2, and the contents. The packaging container-filler member 10 in the contents-filled packaging container 2 is transformed into a box shape of a cube or a rectangular parallelepiped. The packaging container-filler member 10 and the bag body 40 in this state are also referred to as the box state C2. The packaging container-filler member 10 in the box state C2 is a cylindrical body whose cross section is rectangular. That is, the front-side sheet 11, the back-side sheet 12, the first connecting sheet 13A, and the second connecting sheet 13B constitute a cylindrical body 15 whose cross section is rectangular when the cylindrical body 15 has a three-dimensional shape.

In the packaging container-filler member 10 that is in the box state C2, the first connecting sheet 13A, the second connecting sheet 13B, and the third connecting sheet 14 are each disposed to extend in the opposing direction Z. The contents are disposed in the packaging container-filler member 10 that is in the box state C2 accommodated in the bag body 40.

The opening 47 of the bag body 40 is closed.

The type of the contents is not particularly limited. For the contents, items are suitable whose commercial value would decrease if crushed. Specifically, the contents include regular tetrahedral tea bags and tea leaves.

Next, a method of manufacturing a contents-filled packaging container of the present embodiment (hereinafter simply referred to as the manufacturing method) is described, in which the packaging container 1 is filled with the contents. In the manufacturing method below, a case is described in which the contents-filled packaging container 2 is manufactured one by one by filling the contents thereinto.

Figure 4:
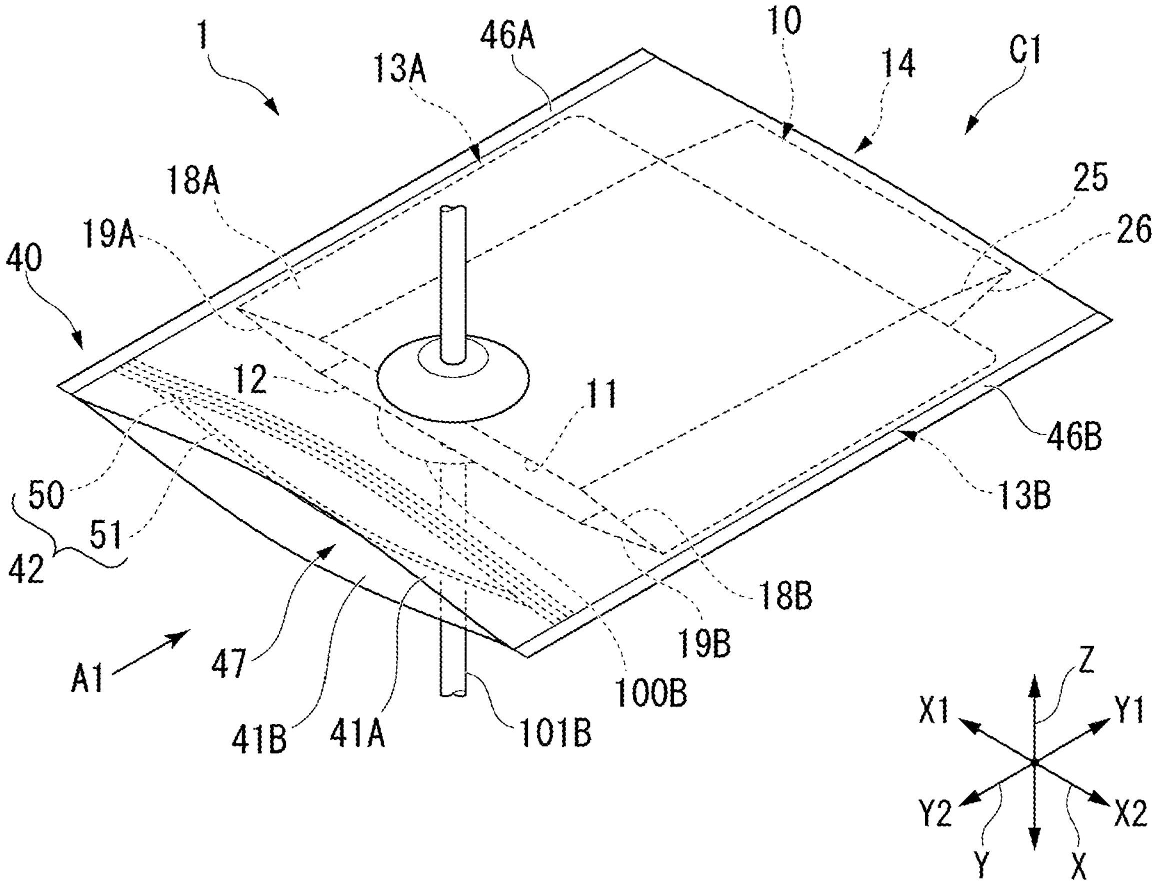
FIG. 4 is a perspective view showing an opening step in a method of manufacturing a contents-filled packaging container of the embodiment of the present invention.
Figure 5:
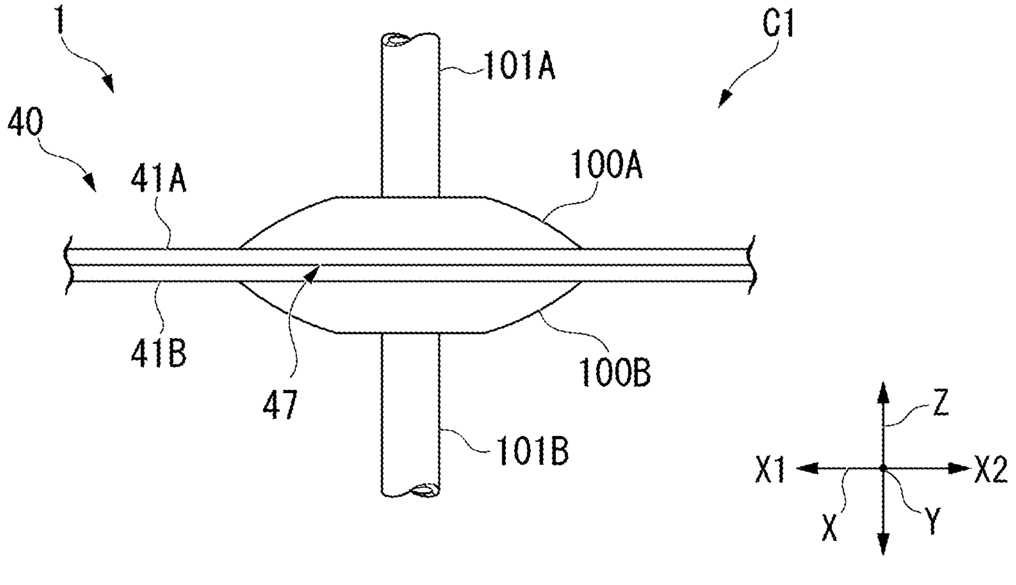
FIG. 5 is a view viewed in arrow A1 direction in FIG. 4.

First, in an opening step, as shown in FIGS. 4 and 5, for example, suction cups 100A and 100B are used to open, in the opposing direction Z, the peripheral edge portions facing each other of the opening 47 of the bag body 40 that is in the flat bag state C1. FIG. 5 shows a state where the opening 47 of the bag body 40 is closed.

The suction cups 100A and 100B are connected to hoses 101A and 101B that can suction the air inside the suction cups 100A and 100B, respectively.

The suction cup 100A is attached to a portion of the flat surface portion 41A close to the opening 47. The suction cup 100B is attached to a portion of the flat surface portion 41B close to the opening 47. The air inside the suction cups 100A and 100B is suctioned through the hoses 101A and 101B. The suction cups 100A and 100B are moved away from each other in the opposing direction Z, and the peripheral edge portions of the opening 47 of the bag body 40 are opened in the opposing direction Z.

When the opening step is completed, the process moves on to the next step.

Figure 6:
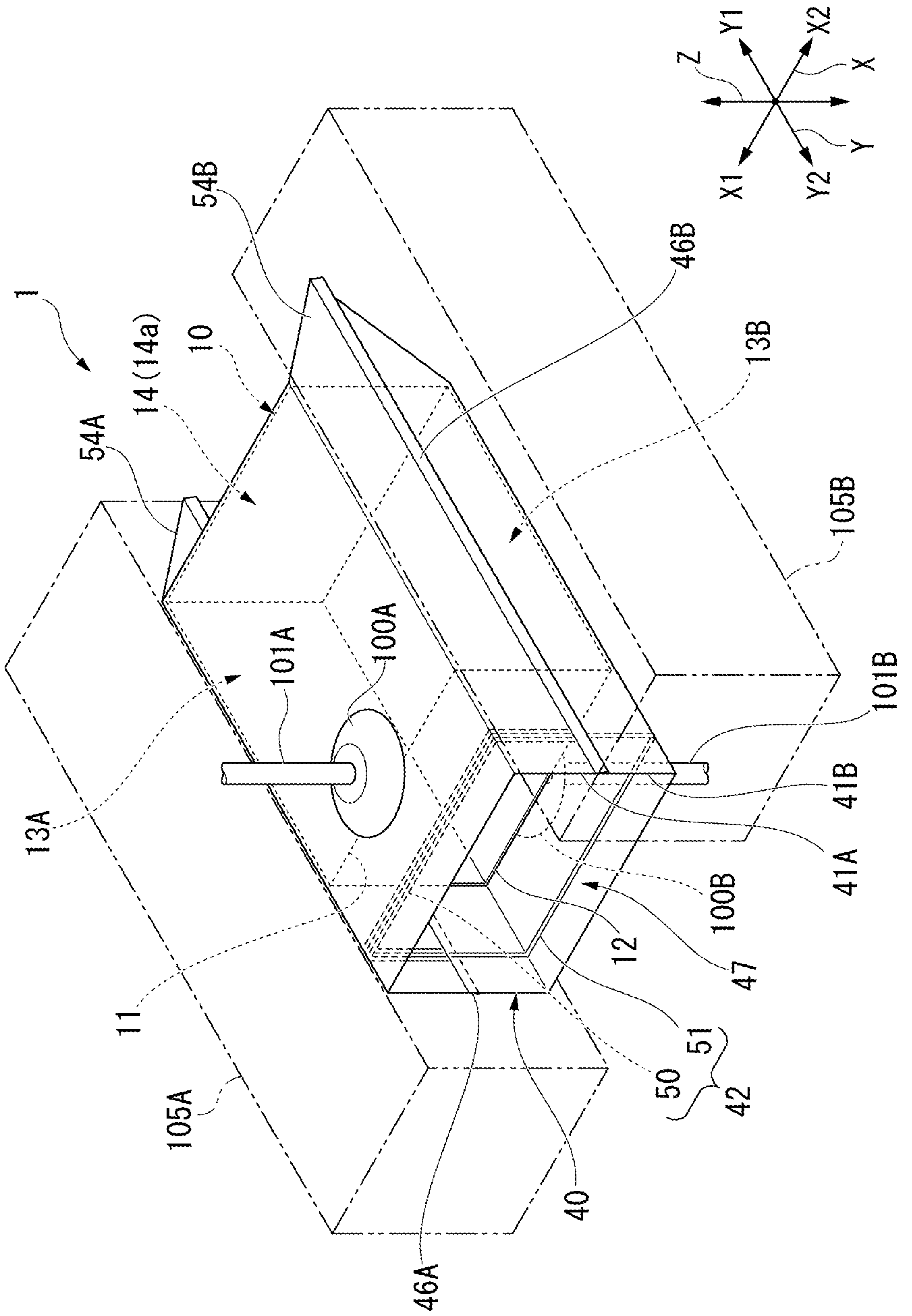
FIG. 6 is a perspective view showing an extending step in the method of manufacturing a contents-filled packaging container.

Next, in an extending step, as shown in FIG. 6, the first connecting sheet 13A, the second connecting sheet 13B, and the third connecting sheet 14 are each deformed in the bag body 40 so as to extend in the opposing direction Z. The third connecting sheet 14 extending in the opposing direction Z constitutes a bottom 14*a*.

At this time, heater blocks 105A and 105B are pressed against the packaging container 1 in the first direction X. It is preferable that the heater blocks 105A and 105B be heated in advance to a temperature at which layers on the outer surface sides of the film materials constituting the bag body 40 can be welded together. By pressing the heater blocks 105A and 105B thereon, the connecting sheets 13A, 13B and 14 are made easy to extend in the opposing direction Z. The packaging container-filler member 10 in the box state C2 that extends in the opposing direction Z and that is made three-dimensional is a cylindrical body whose cross section is rectangular. The bottom 14*a* covers an opening on one side of the cylindrical body.

When the heater blocks 105A and 105B are pressed thereon, the heat-seal portions 46A and 46B that are the side flaps are bent in the opposing direction Z. The heat-seal portions 46A and 46B are welded to, for example, portions of the flat surface portion 41B (or the flat surface portion 41A) other than the heat-seal portions 46A and 46B.

By pressing the heater blocks 105A and 105B, protruding portions 54A and 54B are formed in the bag body 40, which further protrude toward the first side Y1 than the third connecting sheet 14 of the packaging container-filler member 10. Each of the protruding portions 54A and 54B is formed in a triangular shape in which the length thereof in the opposing direction Z gradually decreases from the second side Y2 toward the first side Y1. The protruding portions 54A and 54B are formed at the ends on the first side X1 and the second side X2, respectively, of the surfaces facing the first side Y1 of the flat surface portions 41A and 41B.

In the extending step, the suction through the hoses 101A and 101B is stopped, and the suction cups 100A and 100B are removed from the flat surface portions 41A and 41B.

Figure 7:
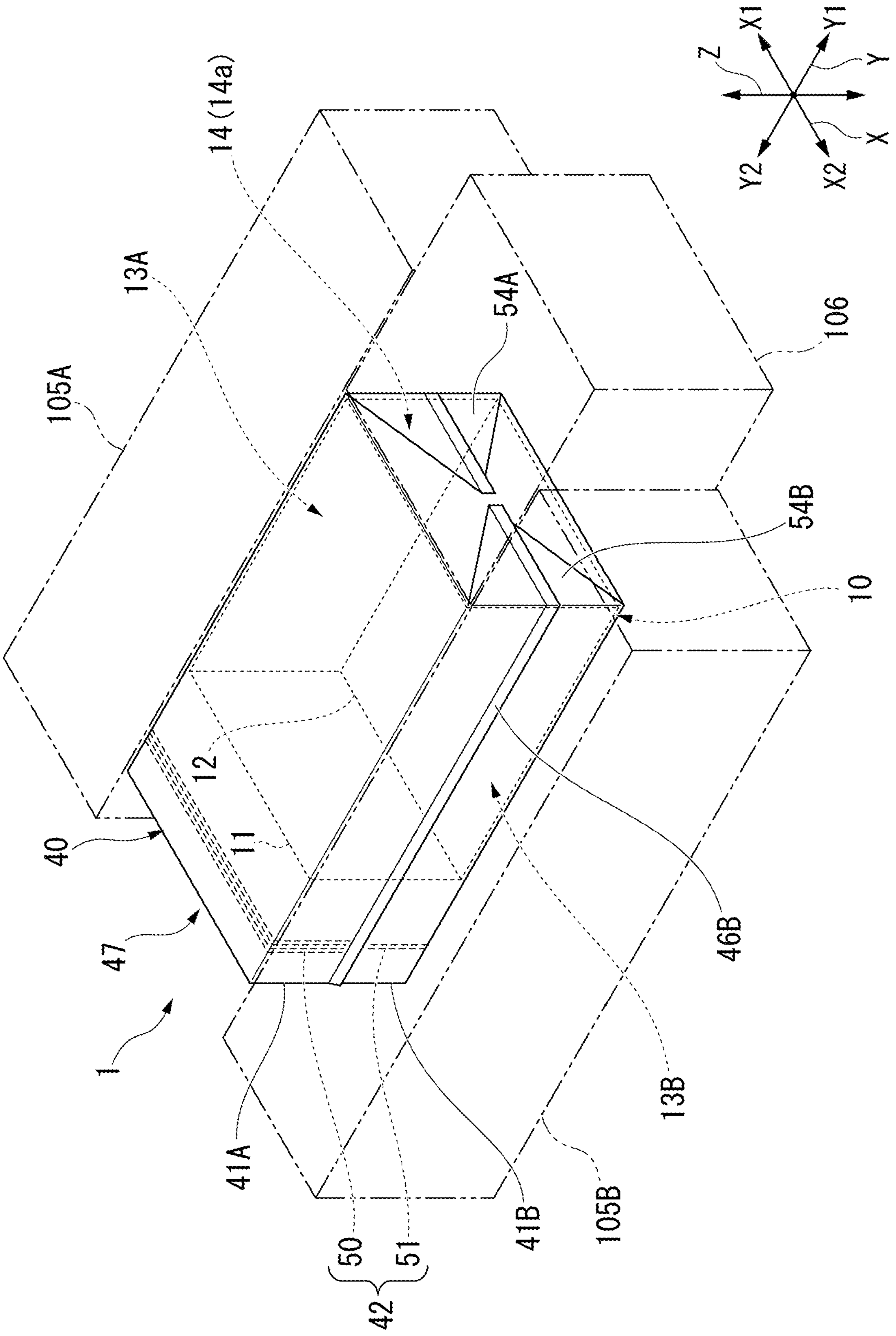
FIG. 7 is a perspective view showing a first folding step in the method of manufacturing a contents-filled packaging container.

Next, in a first folding step, as shown in FIG. 7, a heater block 106 is pressed against the packaging container 1 from the first side Y1 toward the second side Y2. When pressing the heater block 106, the protruding portions 54A and 54B are bent toward the inside (i.e., the center) of the packaging container 1 in the first direction X. The protruding portions 54A and 54B are welded to the surfaces facing the first side Y1 of the flat surface portions 41A and 41B.

Next, in a filling step, the contents are filled into a space between the front-side sheet 11 and the back-side sheet 12 of the packaging container-filler member 10 accommodated in the bag body 40 through the opening 47 of the bag body 40. When filling the contents is completed, the heater blocks 105A, 105B and 106 are separated from the packaging container 1.

Figure 8:
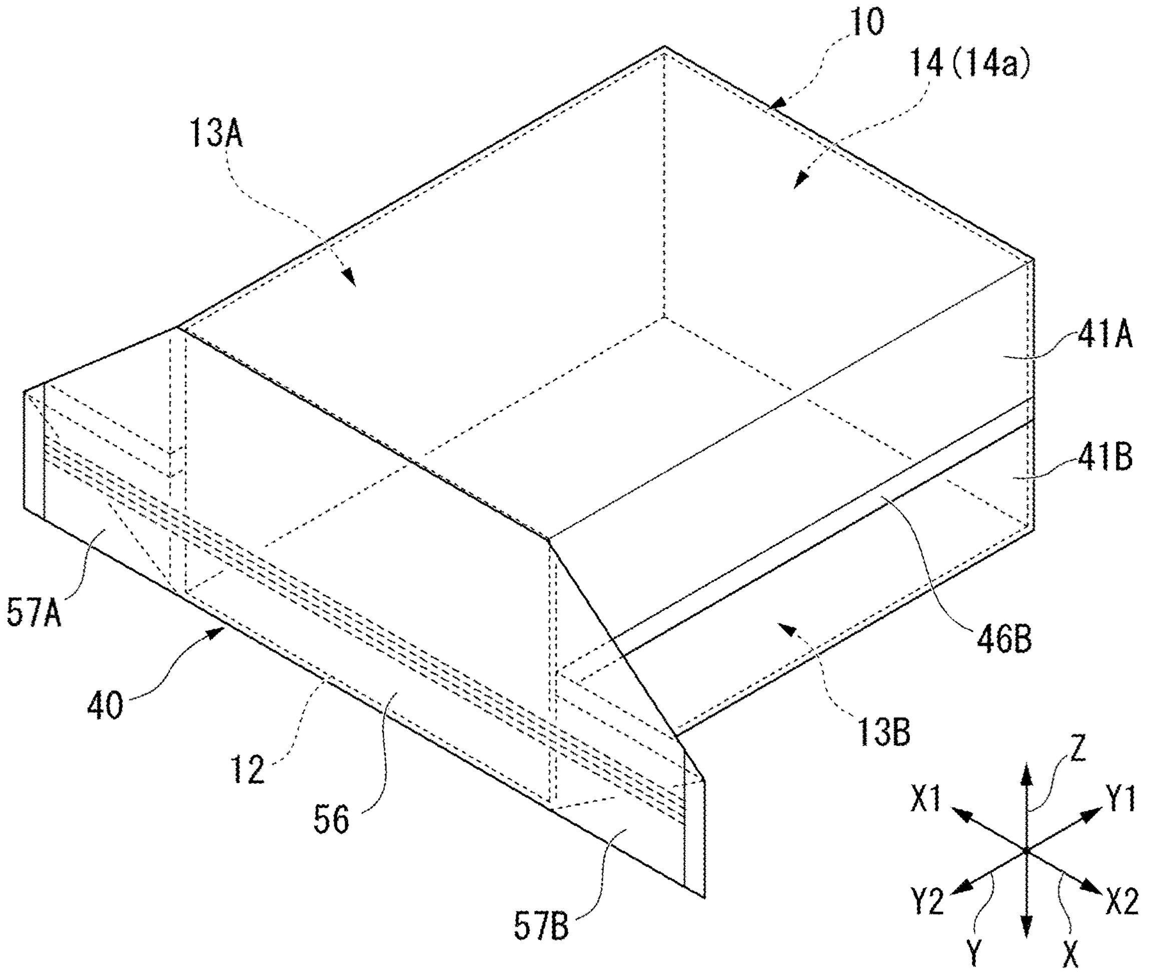
FIG. 8 is a perspective view showing a second folding step in the method of manufacturing a contents-filled packaging container.

Next, in a second folding step, by performing similar steps to the extending step and the first folding step, as shown in FIG. 8, the opening 47 of the bag body 40 is closed, and a top flap 56 is formed in the packaging container 1. The top flap 56 is bent in the opposing direction Z and is welded to the surfaces of the flat surface portions 41A and 41B facing the second side Y2. As a result, in the top flap 56, protruding portions 57A and 57B are formed to further protrude toward the first side X1 and the second side X2, respectively, than the packaging container-filler member 10. The protruding portions 57A and 57B are welded to the surfaces of the flat surface portions 41A and 41B facing the first side X1 and the second side X2, respectively.

When the second folding step is completed, all steps of the manufacturing method are completed, and the contents-filled packaging container 2 shown in FIG. 3 is manufactured.

As described above, the packaging container-filler member 10 of the present embodiment is accommodated in the bag body 40 through the opening 47 of the bag body 40. Then, the first connecting sheet 13A, the second connecting sheet 13B, and the third connecting sheet 14, which have been each folded in the opposing direction Z, are each deformed so as to extend in the opposing direction Z. Then, a space is secured between the front-side sheet 11 and the back-side sheet 12. The front-side sheet 11, the back-side sheet 12, the connecting sheets 13A and 13B as a whole are formed into a cylindrical shape whose cross section is rectangular, and the outer edges of the front-side sheet 11 and the back-side sheet 12 on the first side Y1 are connected by the third connecting sheet 14 extending in the opposing direction Z. Therefore, the third connecting sheet 14 supports, in the opposing direction Z, forces acting from the outside of the bag body 40 and efficiently resists the pressing for sealing the protruding portions 54A and 54B to the bottom. Therefore, since it efficiently withstands external forces even if no holding plates are used, the steps of inserting and removing the holding plates as in the related art do not have to be performed, so the period of time required for filling can be decreased.

Since a bonding machine 169 including the holding plates is not required, a manufacturing machine for the contents-filled packaging container 2 can prevent the size thereof from unnecessarily increasing, the quantity of the contents-filled packaging containers 2 manufactured per unit time can be increased, and the manufacturing thereof can be performed by using general filling machines.

The first connecting sheet 13A is folded to be convex from the second side X2 toward the first side X1, the second connecting sheet 13B is folded to be convex from the first side X1 toward the second side X2, and the third connecting sheet 14 is folded to be convex from the second side Y2 to the first side Y1. The folded first connecting sheet 13A, the folded second connecting sheet 13B, and the folded third connecting sheet 14 do not overlap the front-side sheet 11 and the back-side sheet 12 in the opposing direction Z. Therefore, the thickness of the packaging container-filler member 10 in the opposing direction Z can be decreased.

The third connecting sheet 14 includes the first bottom edge-connecting piece 25, the second bottom edge-connecting piece 26, the first bottom edge hinge 27, the second bottom edge hinge 28, and the third bottom edge hinge 29. When the folded third connecting sheet 14 is extended in the opposing direction Z, the first bottom edge-connecting piece 25 and the second bottom edge-connecting piece 26 rotate on the first bottom edge hinge 27, the second bottom edge hinge 28, and the third bottom edge hinge 29, and the first bottom edge-connecting piece 25 and the second bottom edge-connecting piece 26 are arranged in the opposing direction Z. Therefore, the first bottom edge-connecting piece 25 and the second bottom edge-connecting piece 26 arranged in the opposing direction Z support, in the opposing direction Z, forces acting in the opposing direction Z from the outside of the bag body 40. Therefore, it is possible to efficiently withstand the external force in the opposing direction Z. The hinge also corresponds to a folding line.

In the packaging container 1 of the present embodiment, the contents can be filled into a space between the front-side sheet 11 and the back-side sheet 12 through the opening 47 of the bag body 40 from the predetermined side D of the packaging container 1.

In the contents-filled packaging container 2 of the present embodiment, the first connecting sheet 13A, the second connecting sheet 13B, and the third connecting sheet 14 are disposed to extend in the opposing direction Z, and thus it is possible to efficiently withstand external forces and to decrease the period of time required for filling. The contents can be disposed inside the packaging container-filler member 10 in which a space is secured between the front-side sheet 11 and the back-side sheet 12. By closing the opening 47 of the bag body 40, the contents can be stored in the bag body 40.

In the manufacturing method of the present embodiment, the first connecting sheet 13A, the second connecting sheet 13B, and the third connecting sheet 14 are each deformed to extend in the opposing direction Z, and thus it is possible to efficiently withstand external forces and to decrease the period of time required for filling. The contents can be disposed inside the packaging container-filler member 10 in which a space is secured between the front-side sheet 11 and the back-side sheet 12. By closing the opening 47 of the bag body 40, the manufacturing method that allows the contents to be stored in the bag body 40 can be obtained.

The configurations of the packaging container-filler member 10 and the manufacturing method of the present embodiment can be variously modified as described below.

Figure 9:
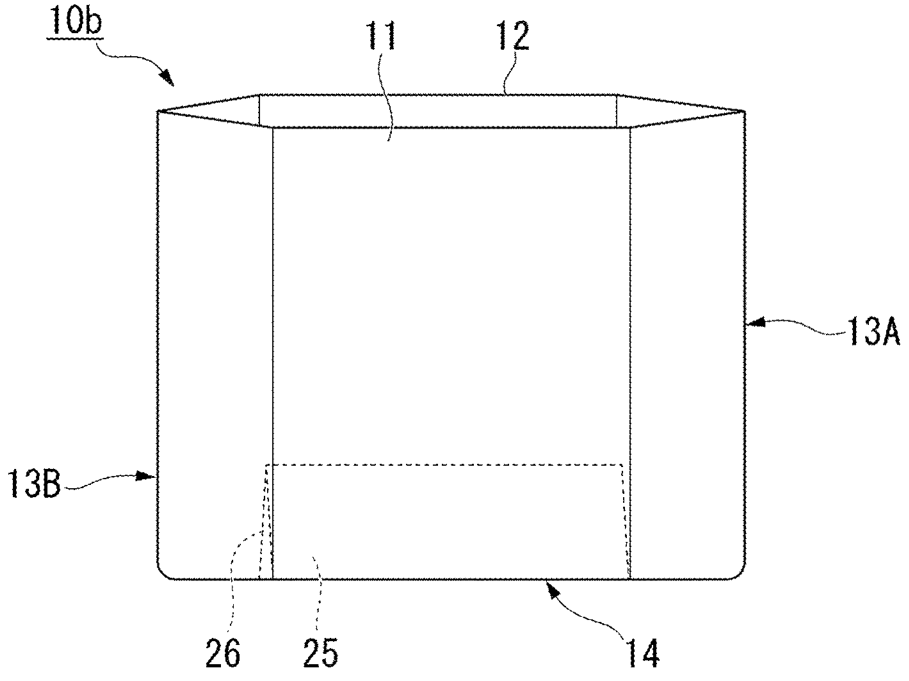
FIG. 9 is a front view of a packaging container-filler member of a modification of the embodiment of the present invention.
Figure 10:
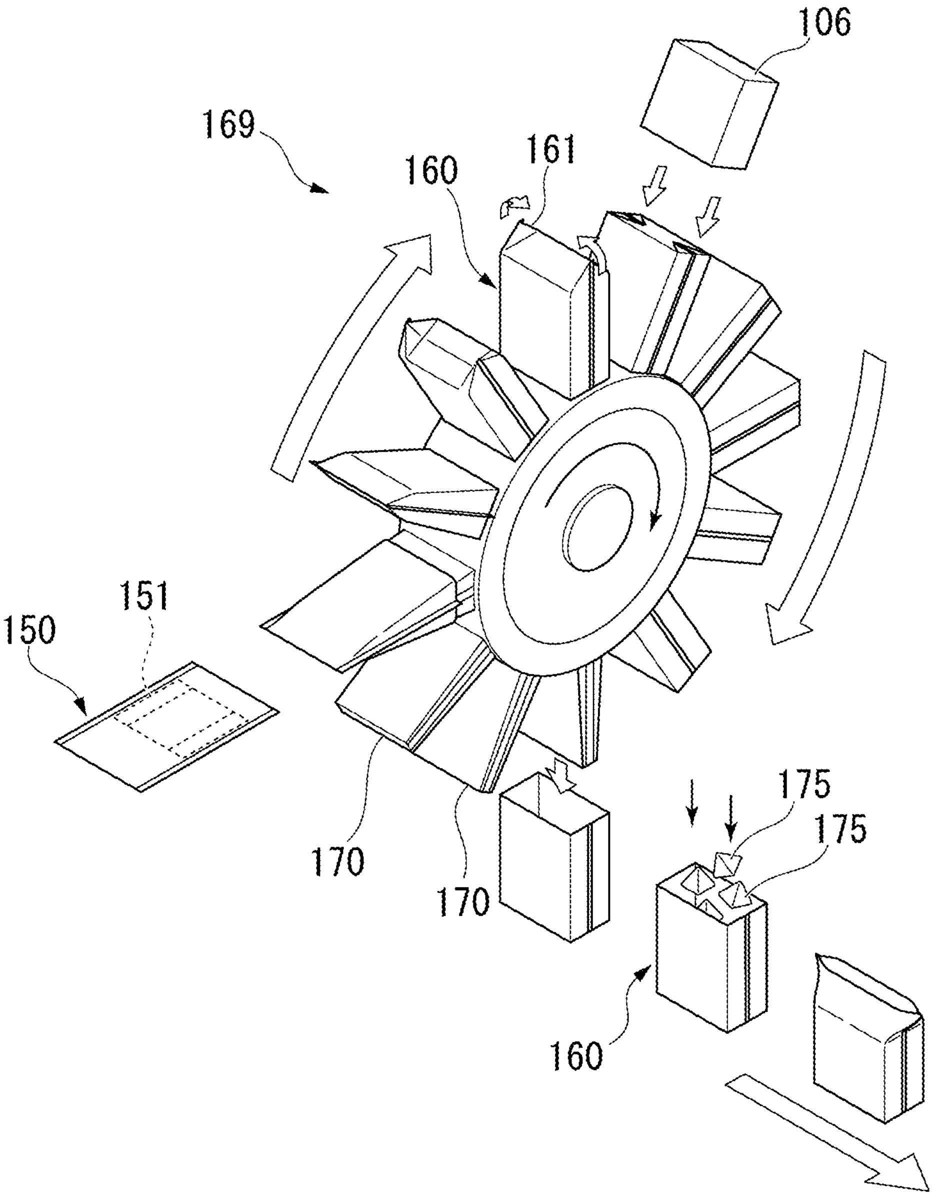
FIG. 10 is a perspective view showing a method of manufacturing a contents-filled packaging container in the related art.

As in a packaging container-filler member 10*b* shown in FIG. 9, the third connecting sheet 14 may be folded so as to be convex from the first side Y1 toward the second side Y2 with respect to the packaging container-filler member 10 of the present embodiment. This third connecting sheet 14 is a so-called inner gazette.

The first connecting sheet 13A may be folded so as to be convex from the first side X1 toward the second side X2, the second connecting sheet 13B may be folded so as to be convex from the second side X2 toward the first side X1, and the third connecting sheet 14 may be folded so as to be convex from the second side Y2 toward the first side Y1.

The first connecting sheet 13A may be folded so as to be convex from the first side X1 toward the second side X2, the second connecting sheet 13B may be folded so as to be convex from the second side X2 toward the first side X1, and the third connecting sheet 14 may be folded so as to be convex from the first side Y1 toward the second side Y2. In this case, in order to prevent the folded first connecting sheet 13A, the folded second connecting sheet 13B, and the folded third connecting sheet 14 from contacting each other, appropriate cutouts may be provided in these sheets or the sizes of these sheets may be appropriately adjusted.

The contents-filled packaging container 2 may be manufactured by in-line (bulk manufacturing).

In this case, a strip-shaped film material is unwound from, for example, a film roll in which a plurality of film materials are wound into a roll in a state where the plurality of film materials are connected into a strip-shape. Then, the female member 50, the male member 51 and the like that constitute the zipper 42 are attached to two end portions of the strip-shaped film material in the width direction thereof. The strip-shaped film material is folded in half in the width direction to form the connecting portion and is heat-welded at each predetermined length.

The packaging container-filler member 10 that is in the flat bag state C1 is inserted into the strip-shaped film material folded in half from each opening formed at the end portion opposite to the connecting portion in the width direction. At this time, the packaging container-filler member 10 is inserted such that the third connecting sheet 14 thereof is brought into contact with the connecting portion.

The strip-shaped film material folded in half is cut at the middle of the heat-welded portion in the longitudinal direction of the strip-shaped film material, thereby manufacturing the packaging container 1 that is in the flat bag state C1.

Next, the opening step, the extending step, the first folding step, the filling step, and the second folding step are continuously performed by in-line, thereby manufacturing the contents-filled packaging container 2.

Although an embodiment of the present invention is described above in detail with reference to the drawings, the specific configuration is not limited to the embodiment, and modifications, combinations, deletions or the like of the configurations within the scope of the present invention are also included therein.

For example, in the above embodiment, the bag body 40 may not include the zipper 42.

The bag body may be a two-sided seal bag that is tubular. In this case, the seal on one side becomes the bottom, and the other side before sealing becomes the opening.

The invention claimed is:

1. A method of manufacturing a contents-filled packaging container, in which a packaging container is filled with contents, the packaging container, includes:

a packaging container-filler member; and a bag body provided with an opening facing a predetermined side and accommodating the packaging container-filler member, the packaging container-filler member, includes:

a front-side sheet and a back-side sheet disposed to oppose each other;

a first connecting sheet connecting outer edges of the front-side sheet and the back-side sheet on a first side in a first direction along the front-side sheet;

a second connecting sheet connecting outer edges of the front-side sheet and the back-side sheet on a second side in the first direction; and a third connecting sheet connecting outer edges of the front-side sheet and the back-side sheet on a first side in a second direction along the front-side sheet, the second direction crossing the first direction, the front-side sheet, the back-side sheet, the first connecting sheet, and the second connecting sheet constitute a cylindrical body whose cross section is rectangular when the cylindrical body has a three-dimensional shape, the first connecting sheet, the second connecting sheet, and the third connecting sheet are each folded in an opposing direction in which the front-side sheet and the back-side sheet oppose each other, and the packaging container-filler member is disposed such that a second side thereof in the second direction is the same as the predetermined side, the method, comprising:

opening peripheral edge portions facing each other of the opening of the bag body;

deforming the first connecting sheet, the second connecting sheet, and the third connecting sheet so as to extend in the opposing direction inside the bag body;

filling the contents between the front-side sheet and the back-side sheet of the packaging container-filler member through the opening of the bag body:

closing the opening of the bag body;

after deforming the first connecting sheet, the second connecting sheet, and the third connecting sheet, and before filling the contents, bending a side flap extending outward from a first surface of the bag body by a pressing force from an outside to adhere the side flap to the first surface, the first surface of the bag body corresponding to the first connecting sheet or the second connecting sheet, wherein when adhering the side flap to the first surface, the third connecting sheet deformed and extending in the opposing direction supports the first surface of the bag body.

2. The method of manufacturing a contents-filled packaging container according to claim 1, wherein the first connecting sheet is folded to be convex from the second side toward the first side in the first direction, the second connecting sheet is folded to be convex from the first side toward the second side in the first direction, and the third connecting sheet is folded to be convex from a second side toward the first side in the second direction of the front-side sheet and the back-side sheet.

3. The method of manufacturing a contents-filled packaging container according to claim 1, wherein the third connecting sheet includes:

a first connecting piece connected to the outer edge of the front-side sheet on the first side in the second direction through a first hinge, and a second connecting piece connected to an outer edge of the first connecting piece through a second hinge and connected to the outer edge of the back-side sheet on the first side in the second direction through a third hinge.

4. The method of manufacturing a contents-filled packaging container according to claim 1, further comprising:

after adhering the side flap to the first surface, and before filling the contents, bending a protruding portion extending outward from a second surface of the bag body by a pressing force from an outside to adhere the protruding portion to the second surface, the second surface of the bag body corresponding to the third connecting sheet, wherein when adhering the protruding portion to the second surface, the first connecting sheet and the second connecting sheet deformed and extending in the opposing direction support the second surface of the bag body.

5. A method of manufacturing a contents-filled packaging container, in which a bag body of a packaging container accommodating a packaging container-filler member is filled with contents, wherein the packaging container-filler member includes:

a front-side sheet and a back-side sheet disposed to oppose each other;

a first connecting sheet connecting outer edges of the front-side sheet and the back-side sheet on a first side in a first direction along the front-side sheet;

a second connecting sheet connecting outer edges of the front-side sheet and the back-side sheet on a second side in the first direction; and a third connecting sheet connecting outer edges of the front-side sheet and the back-side sheet on a first side in a second direction along the front-side sheet, the second direction crossing the first direction, the method comprising:

opening peripheral edge portions facing, in an opposing direction, each other of an opening of the bag body, the opposing direction being in which the front-side sheet and the back-side sheet oppose each other;

deforming the first connecting sheet, the second connecting sheet, and the third connecting sheet so as to extend in the opposing direction inside the bag body and pressing a heater block against the packaging container in the first direction to form a protruding portion in the bag body, the protruding portion further protruding toward the first side in the second direction than the third connecting sheet of the packaging container-filler member;

pressing a heater block against the packaging container from the first side in the second direction toward a second side in the second direction to weld the protruding portion to a surface of the bag body facing the first side in the second direction; and filling the contents between the front-side sheet and the back-side sheet of the packaging container-filler member through the opening of the bag body, and closing the opening of the bag body.

* * * * *